United States Patent [19]

Saha et al.

[11] Patent Number: 5,268,249

[45] Date of Patent: Dec. 7, 1993

[54] MAGNETIC CARRIER PARTICLES

[75] Inventors: Bijay S. Saha; Alec N. Mutz, both of Rochester, N.Y.

[73] Assignee: Eastman Kodak Company, Rochester, N.Y.

[21] Appl. No.: 968,942

[22] Filed: Oct. 29, 1992

[51] Int. Cl.$^5$ .................... G03G 9/107; G03G 9/113
[52] U.S. Cl. .................... 430/106.6; 430/108; 430/111; 252/62.63; 252/62.64
[58] Field of Search .................... 430/106.6, 108, 111; 252/62.63, 62.64

[56] References Cited

U.S. PATENT DOCUMENTS

| | | | |
|---|---|---|---|
| 3,053,770 | 9/1962 | Counts | 252/62.63 |
| 3,582,266 | 6/1971 | Sopp et al. | |
| 3,634,254 | 1/1972 | Micheli | |
| 3,713,819 | 1/1973 | Hagenbach et al. | 430/108 |
| 3,716,630 | 2/1973 | Shire | 252/62.63 |
| 3,718,594 | 2/1973 | Miller | 430/108 |
| 3,725,283 | 2/1973 | Fenity | 430/108 |
| 3,795,617 | 3/1974 | McCabe | 430/108 |
| 3,795,618 | 3/1974 | Kasper | 430/108 |
| 3,810,973 | 5/1974 | Arendt et al. | |
| 3,893,935 | 7/1975 | Tadwin et al. | 430/110 |
| 3,938,992 | 2/1976 | Jadwin et al. | 430/120 |
| 3,941,898 | 3/1976 | Sadamatsu et al. | 430/109 |
| 4,025,449 | 5/1977 | Pezzoli et al. | 252/62.63 |
| 4,076,857 | 2/1978 | Kasper et al. | 430/103 |
| 4,124,385 | 11/1978 | O'Horo | 430/108 |
| 4,124,735 | 11/1978 | O'Horo | 430/108 |
| 4,126,437 | 11/1978 | O'Horo | 430/108 |
| 4,336,173 | 6/1982 | Ugelstad | 523/205 |
| 4,341,648 | 7/1982 | Kubo et al. | 252/62.63 |
| 4,394,430 | 7/1983 | Jadwin et al. | 430/108 |
| 4,401,643 | 8/1983 | Hibst et al. | 423/594 |
| 4,407,721 | 10/1983 | Koike et al. | 252/62.59 |
| 4,414,124 | 11/1983 | Endo et al. | 252/62.63 |
| 4,425,250 | 1/1984 | Hibst | 252/62.59 |
| 4,459,378 | 7/1984 | Ugelstad | 523/205 |

(List continued on next page.)

FOREIGN PATENT DOCUMENTS

| | | |
|---|---|---|
| 2428004 | 1/1975 | Fed. Rep. of Germany. |
| 60-071528-A | 4/1985 | Japan. |
| 60-122727-A | 7/1985 | Japan. |
| 62-59531-A | 3/1987 | Japan. |
| 1501065 | 2/1978 | United Kingdom. |

OTHER PUBLICATIONS

Lotgering, F. K. and Vromans, P. H. G. M., "Chemical Instability of Metal-Deficient Hexagonal Ferrites with Structure", *Journal of the American Ceramic Society*, vol. 60, No. 9-10 (Feb. 3, 1977), pp. 416-418.

(List continued on next page.)

*Primary Examiner*—Roland Martin
*Attorney, Agent, or Firm*—Willard G. Montgomery

[57] ABSTRACT

Carrier particles suitable for magnetic brush development comprising hard magnetic ferrite material having a single phase, W-type hexagonal crystalline structure represented by the formula $MFe_{16}Me_2O_{27}$ where M is strontium or barium and Me is a divalent transition metal selected from the group consisting of nickel, cobalt, copper, zinc, manganese, magnesium, iron and mixtures thereof, exhibiting a coercivity of approximately 100 to 300 Oersteds when magnetically saturated and an induced magnetic moment of at least 60 EMU/g when in an applied magnetic field of 1000 Oersteds are disclosed. Also disclosed are electrostatic two-component dry developer compositions comprising charged toner particles mixed with oppositely charged carrier particles comprising the magnetically hard ferrite material described above and a method of developing an electrostatic charge pattern by contacting the charge pattern with a two-component dry developer composition described above.

The carrier particles provide high development efficiencies and improved image density.

17 Claims, No Drawings

U.S. PATENT DOCUMENTS

| | | | |
|---|---|---|---|
| 4,473,029 | 9/1984 | Fritz et al. | 430/122 |
| 4,546,060 | 10/1985 | Miskinis et al. | 430/106.6 |
| 4,623,603 | 11/1986 | Iimura et al. | 430/108 |
| 4,664,831 | 5/1987 | Hibst et al. | 252/62.59 |
| 4,764,445 | 8/1988 | Miskins et al. | 430/108 |
| 4,806,265 | 2/1989 | Suzuki et al. | 252/62.63 |
| 4,824,587 | 4/1989 | Kwon et al. | 252/62.55 |
| 4,855,205 | 8/1989 | Saha et al. | 430/108 |
| 4,855,206 | 8/1989 | Saha | 430/108 |
| 4,957,812 | 9/1990 | Aoki et al. | 252/62.63 |
| 5,061,586 | 10/1991 | Saha et al. | 430/108 |
| 5,104,761 | 4/1992 | Saha et al. | 430/108 |
| 5,106,714 | 4/1992 | Saha et al. | 430/108 |
| 5,135,733 | 8/1992 | Robert et al. | 423/594 |
| 5,190,841 | 3/1993 | Saha et al. | 430/108 X |
| 5,190,842 | 3/1993 | Saha et al. | 430/108 X |

OTHER PUBLICATIONS

Litsardakis, G. and Samaras, D., "Magnetic Properties of the $Sr(Ba)Zn_xMn_{2-x}$-W Hexagonal Ferrites", *Journal of Magnetism and Magnetic Materials*, Apr. 20, 1989), pp. 184–188.

Almodovar, N. Saurez, LLamazaras, J. L. Sanchez, Leccabue, F., Panizzieri, R. and Xue Rong Hwa, "Magnetic Characterization of $SrFe_2Fe_{16}O_{27}$ Ferrite Prepared by Chemical Coprecipitation Method", *Materials Letters*, vol. 8, No. 3.4 (Mar. 8, 1989), pp. 127–131.

Leccabue, F., Panizzieri, R., Garcia, S., Saurez, N., Sanchez, J. L., Ares, O. and Hwa Xue Rong, "Magnetic and Mössbauer Study of Rare-Earth-Substituted M-, W-, and X-Type Hexagonal Ferrite", *Journal of Materials Science*, vol. 25 (1990), pp. 2765–2770.

MAGNETIC CARRIER PARTICLES

FIELD OF THE INVENTION

This invention relates to an electrostatographic developer and, more particularly, to an improvement in a ferrite-carrier as a toner carrier in a two-component developer suitable for use in magnetic brush dry development of electrostatic charge patterns.

BACKGROUND OF THE INVENTION

The terms "electrography" and "electrographic" as used herein broadly include various processes that involve forming and developing electrostatic charge patterns on surfaces, with or without the use of light. They include electrophotography and other processes. One method of electrographic development is the magnetic brush method which is widely used for dry development in electrophotographic document copying machines. It is disclosed, for example, in U.S. Pat. No. 3,003,462. Such a developer is a mixture of thermoplastic toner particles and magnetic carrier particles, the latter of which may optionally be coated with an insulating resin in order to enhance the tribocharging capability of the carrier particles.

In the development station of a copying machine, the two-component developer, which includes the magnetic carrier particles, is applied to the electrostatic charge pattern by means of a magnetic applicator which comprises a cylindrical sleeve of non-magnetic material having a magnetic core positioned within. The core usually comprises a plurality of parallel magnetic strips which are arranged around the core surface to present alternative north/south magnetic fields. These fields project radially, through the sleeve and serve to attract the developer composition to the sleeve's outer surface to form a brush nap. Either or both the cylindrical sleeve and the magnetic core are rotated with respect to each other to cause the developer to advance from a supply sump to a position close to or in contact with the electrostatic charge pattern to be developed, e.g., as in the patent to Miskinis et al., U.S. Pat. No. 4,546,060. By frictional contact with the carrier particles, the toner particles are triboelectrically charged and cling to the carrier particles, creating bristle-like formations of developer on the magnetic brush sleeve. In developing a charge pattern, the brush is brought close to or in contact with the charged surface. The oppositely charged toner particles are drawn away from the carrier particles on the magnetic brush by the more strongly charged electrostatic charge pattern, thus developing and making visible the charge pattern.

Especially useful as the carrier particles in two-component developers are strontium and barium ferrites. Ferrites, as used herein, are magnetic oxides containing iron as a major metallic component. The ferrites of strontium and barium referred to herein are the ferrites of strontium and barium, having the formula $SrFe_{12}O_{19}$ and $BaFe_{12}O_{19}$. These ferrite carriers are disclosed in U.S. Pat. No. 4,546,060 to Miskinis et al and U.S. Pat. No. 4,764,445 to Saha, both of which are incorporated herein by reference. Strontium and barium ferrites, being hard magnetic materials, are desirable as carrier particles. The use of such "hard" magnetic materials which exhibit a coercivity of at least 300 Oersteds when magnetically saturated and an induced magnetic moment of at least 20 EMU/g when in an applied magnetic field of 1000 Oersteds as carrier particles has been found to dramatically increase the speed of development when compared to conventional magnetic carriers made of relatively "soft" magnetic materials such as magnetite, pure iron, ferrite or a form of $Fe_3O_4$ having magnetic coercivities of about 100 gauss or less.

The terms "hard and "soft" when referring to magnetic materials have the generally accepted meaning as identified on page 18 of *Introduction to Magnetic Materials* by B. D. Cullity, published by Addison-Wesley Publishing Company, 1972.

As such, these hard magnetic carrier materials represent a significant advancement in the art over the previously used soft magnetic carrier materials in that the speed of development is remarkably increased. Speeds as high as four times the maximum speed utilized in the use of soft magnetic carrier particles have been demonstrated.

However, a problem that has been encountered with such hard magnetic ferrite carrier particles containing strontium and barium is that these materials have not always been found to be satisfactory with respect to copy image density. That is, it has been observed that as development speed or efficiency progressively increases using developer compositions comprising such hard ferrite carrier particles and oppositely charged toner particles, the density of the developed images produced thereby progressively decreases. This is particularly noticeable in the solid, colored image area portions of the toner image which appear lighter or fainter in appearance than desired. This is due primarily to the progressive inability of the carrier particles to deliver an amount of toner particles sufficient enough to completely develop the electrostatic charge pattern on the charged surface as the development speed progressively increases. While not wishing to be bound by any theory, it is believed that this phenomena is due to the following.

In the development of electrostatic charge patterns utilizing a rotating-core magnetic applicator described above, the hard magnetic ferrite carrier particles join together to form hair-like chains or bristles of carrier particles which extend outward from the sleeve or outer shell of the rotating-core magnetic applicator. As the core rotates, the field from each pole of the magnets within the applicator travels circumferentially around the outer surface of the shell. As a result, these chains of carrier particles are exposed to a succession of magnetic fields emanating from the rotating-core applicator and are caused to flip or turn to move into magnetic alignment in each new field. Each flip is accompanied by a rapid circumferential step by each particle in a direction opposite the movement of the rotating core. The observed result is that the developer flows smoothly and at a rapid rate around the shell while the core rotates in the opposite direction thus delivering fresh toner to the electrostatic charge pattern. However, the length of the carrier particle chains which are formed on the outer surface of the sleeve or shell of the rotating-core magnetic applicator are not long enough to provide a carrier surface area large enough to triboelectrically charge an amount of toner particles sufficient enough and at a charging level high enough to completely develop the electrostatic charge pattern to be developed as the development speed progressively increases.

We have now found, however, that this problem can be obviated by using, as a toner carrier, an electrostatographic ferrite carrier which comprises hard magnetic ferrite material having a single phase, W-type hexagonal crystalline structure represented by the general formula $MFe_{16}Me_2O_{19}$ where M is strontium or barium and Me is a divalent transition metal selected from the group consisting of nickel, cobalt, copper, zinc, manganese, iron and mixtures thereof, and exhibits a coercivity of from approximately 100 Oersteds to 300 Oersteds when magnetically saturated and an induced magnetic moment of at least 60 EMU/g when in an applied magnetic field of 1000 Oersteds. We have found that copy image density utilizing the ferrite carriers of the present invention can be increased by at least three times over the copy image density obtained with the hard ferrite carriers of the prior art previously described at equivalent high development speeds. How this is accomplished is described in detail below.

SUMMARY OF THE INVENTION

Accordingly, the present invention provides carrier particles suitable for magnetic brush development of electrostatic charge patterns in which the carrier particles comprise hard magnetic ferrite material having a single-phase, W-type hexagonal crystalline structure represented by the general formula $MFe_{16}Me_2O_{27}$ where M is strontium or barium and Me is a divalent transition metal selected from the group consisting of nickel, cobalt, copper, zinc, manganese, magnesium, iron and mixtures thereof, exhibiting a coercivity of from approximately 100 to 300 Oersteds when magnetically saturated and an induced magnetic moment of at least 60 EMU/g when in an applied magnetic field of 1000 Oersteds.

The invention also contemplates an electrographic developer suitable for extremely high speed copying applications and capable of providing high copy image densities including charged toner particles and oppositely charged carrier particles as described above.

Thus, in another embodiment of the present invention, there also is provided an electrostatographic developer composition suitable for magnetic brush development of electrostatic charge patterns which comprises a mixture of charged toner particles and oppositely charged carrier particles comprising hard magnetic ferrite material having a single-phase, W-type hexagonal crystalline structure represented by the general formula $MFe_{16}Me_2O_{27}$ where M is strontium or barium and Me is a divalent transition metal selected from the group consisting of nickel, cobalt, copper, zinc, manganese, magnesium, iron and mixture thereof, exhibiting a coercivity of from approximately 100 to 300 Oersteds when magnetically saturated and an induced magnetic moment of at least 60 EMU/g when in an applied magnetic field of 1000 Oersteds.

Further provided is a method of developing electrostatic charge patterns on a surface which comprises contacting the charge pattern with a two-component dry electrostatographic developer composition which comprises a mixture of charged toner particles and oppositely charged carrier particles comprising hard magnetic ferrite material having a single-phase, W-type hexagonal crystalline structure represented by the general formula $MFe_{16}Me_2O_{27}$ wherein M is strontium or barium and Me is a divalent transition metal selected from the group consisting of nickel, cobalt, copper, zinc, manganese, magnesium, iron and mixtures thereof, exhibiting a coercivity of from approximately 100 to 300 Oersteds when magnetically saturated and an induced magnetic moment of at least 60 EMU/g when in an applied magnetic field of 1000 Oersteds.

DETAILED DESCRIPTION OF THE INVENTION

As mentioned previously, when "hard" magnetic materials such as those materials having the formula $MO.6Fe_2O_3$ where M is barium or strontium as disclosed in U.S. Pat. Nos. 4,546,060 and 4,473,029 (the disclosures of which are incorporated herein by reference) are used as carrier particles in developer compositions comprising such charged carrier particles and oppositely charged toner particles, the speed of development is dramatically increased as compared to carrier particles made of "soft" magnetic particles. However, while the speed with which development can be carried out using such hard magnetic ferrite materials is much higher than the speed with which development can be carried out using the "soft" magnetic materials, there is a progressive decrease in the density of the toned images produced using such developer compositions, particularly in the solid, colored image area portions of the toner image as the development or copying speed progressively increases.

Surprisingly, Applicants have found that the aforementioned problem can be overcome by the use of charged carrier particles comprising the W-type hexagonal ferrites described above in developer compositions comprising such carrier particles and oppositely charged toner particles.

While development speed is generally referred to in the prior art, a more meaningful term is to speak of "development efficiency". In a magnetic brush development system, development efficiency is defined as the potential difference between the photoreceptor in developed image areas before and after development divided by the potential difference between the photoreceptor and the brush prior to development times 100. Thus, for example, if the photoreceptor film voltage is $-250$ volts and the magnetic brush is $-50$ volts, the potential difference is $-200$ volts prior to development. If, during development, the film voltage is reduced by 100 volts to $-150$ volts in image areas by the deposition of positively charged toner particles, the development efficiency is $(-100 \text{ volts} \div -200 \text{ volts})$ times 100 which gives an efficiency of development of 50 percent.

The ferrite material used in this invention has a single-phase, hexagonal crystalline structure with the W-type structure and chemical formula $MFe_{16}Me_2O_{27}$ where M is barium or strontium and Me is a divalent transition metal consisting of nickel, cobalt, copper, zinc, manganese, magnesium, iron or mixtures thereof.

The carriers of this invention can be prepared by conventional procedures that are well known in the art of making ferrites. Suitable procedures are described, for example, in U. S. Pat. Nos. 3,716,630, 4,623,603, and 4,042,518; K. Master, "Spray Drying Handbook", George Godwin Limited, London, 1979, and "Ferromagnetic Materials" Volume 3 edited by E. P. Wohlfarth and published by North Holland Publishing Company, Amsterdam, N.Y., page 315 et seq. For example, a typical preparation procedure might consist of mixing the oxides or salts of the elements such as the carbonates, sulfates, nitrates or phosphates convertible to the oxide by heat in the appropriate proportions using an organic binder and a polar solvent (typically water) and spray-drying the mixture to form a fine, dry particulate. More particularly, a mixture of the ferrite-forming precursor materials or particles is mixed with a solution of an organic binder, such as guar gum, and water, ball milled into a liquid slurry and then spray dried to form unreacted, nonmagnetic, dried green beads. Spray drying is the most commonly used technique to manufacture green beads. This technique is described in previously mentioned K. Masters, "Spray Drying Handbook", George Godwin Limited, London, 1979, which is hereby incorporated by reference.

During the ball milling process, a liquid slurry is produced containing the constituent raw materials. Extensive ball milling is required to achieve as intimate a mixture of the constituent ferrite-forming materials as possible. During spray drying, the solvent (e.g., water) in the liquid droplet is evaporated. In the dried droplet, the organic binder acts to bind the constituent ferrite-forming materials or particles together.

In order to keep the particles or powders well suspended in the aqueous media containing the organic binder, a small amount of surfactant, such as ammonium polymethacrylate or sodium polymethacrylate is typically added to the aqueous media. The concentration of the surfactant may be varied about 0.02 to about 0.04 percent by weight of the ferrite-forming solids in the slurry.

Guar gum is a natural product which has been widely used in industry because it is inexpensive, nontoxic, soluble in water and generally available. It also undergoes nearly complete combustion in the subsequent firing stage, leaving little residue in the magnetic ferrite carrier particles. Upon evaporation, these droplets form individual green beads of substantially uniform particle size and substantially spherical shape.

If desired, binder materials other than guar gum or gum arabic such as polyvinyl alcohol, dextrin, lignosulfonate and methyl cellulose can be used in the practice of the present invention.

In order to prepare the magnetic carrier particles, the green beads are subsequently fired at high temperatures. During the firing process, the individual particulates within the individual green beads react to produce the desired crystallographic phase. Thus, during the firing process, the individual unreacted ferrite-forming precursor components bound in the nonmagnetic green bead react to form the magnetic carrier particles, which, like the green beads, are of substantially uniform particle size and substantially spherical shape. The organic binder is degraded and is not present in the magnetic carrier particles. The magnetic character of the carrier particle is primarily controlled by the chemical stoichiometry of the constituting ferrite-forming materials and the processing conditions of reaction time and temperature. For optimum carrier performance, it is important that the chemical composition of the green beads be maintained throughout the spray drying process. The disintegration of green beads can result in chemically heterogenous green bead particles, which will lead to less than optimum chemical reactions during the firing process and inferior magnetic performance of the final product.

In preparing the ferrite carrier particles of the present invention, a two-step firing cycle is required in order to insure that the resultant magnetic carrier particles possess the requisite magnetic properties needed to develop electrostatic charge patterns or images of extremely high quality and at high development speeds. In order to achieve this, the green bead particulate is first fired at approximately 1000° C. to 1500° C. for a period of time of from approximately 10 to 20 hours and then fired at a second lower temperature ranging from approximately 800° C. to 1000° C. for a period of time of from approximately 4 to 6 hours.

Generally, a ball milling device which utilizes stainless steel balls is used to mix the ferrite-forming starting materials in slurry form. However, the ferrite-forming starting materials may be mixed in slurry form in any one of a number of types of equipment such as a vibrating pebble mill, a high speed stirrer with counter turning rotor and blades, an impeller mixer, a high speed dispersator, a high speed mixer or other conventional mixing equipment in lieu of a ball milling device. The actual degree of mixing achieved may be controlled by the choice of equipment used and selection of specific equipment operating parameters and/or slurry conditions such as mixing speed, mixing time, viscosity and temperature. Where it is desired to obtain controlled particle size reduction during the mixing operation, then the choice of equipment will generally predominate. In the case of a ball milling device, a smooth, homogeneous slurry is generally formed after approximately 12 hours of agitation depending on the equipment capacity and the size of the batch prepared. Following the milling operation, it is generally preferred to screen the slurries prior to spray drying in order to eliminate any large, solid particles which may be present as would plug the atomizer.

A spray dryer designed for either spray nozzle atomization of spray machine-disc atomization or equivalent may be employed to dry the slurry of ferrite-forming starting materials. A particularly desirable type of spray machine is one that is essentially a closed pump impeller driven by a variable speed drive and is commonly termed a spinning atomizer, disc or wheel. A Niro Atomizer or Niro Spray Dryer (disc type) is especially useful. The total system generally consists of a power-coolant-lubrication console, power cables, fluid transport hoses, and a variable speed motor drive with closed impeller. The high speed impeller uses the energy of centrifugal force to atomize the slurry. The particle size distribution obtained with this spray machine is generally narrow. Preferably, when employing the spinning atomizer, the spray dryer should have a large diameter configuration to avoid sticking of the atomized ferrite-forming precursor particles to the dryer chamber walls. Slurries of ferrite-forming particles may be atomized using two-fluid nozzles where the atomizing force is pressured air, single-fluid pressure nozzles where the atomizing force is the pressure of the slurry itself released through an orifice, and centrifugal atomization by spinning wheel or other suitable atomization method. The atomizing pressures, or the speed of rotation in the case of wheel atomization, and the slurry feed rates may be varied as a partial control of particle size. It is also possible to control the particle size of the spray dried ferrite-forming beads by varying the percentage of solids in the feed slurry. The atomizing force and feed rate should be adjusted to the configuration, size and volumetric air flow of a given drying chamber in order that atomized particles do not contact drying chamber surfaces while still wet. In accordance with the method of the present invention, the percentage of solids in the feed slurry may be varied from about 30 to about 70 percent by weight of the ferrite-forming precursor materials slurried in the liquid medium. As previously discussed, a surfactant material, such as ammonium polymethacrylate or sodium polymethacrylate is typically added to the slurry. The concentration of the surfactant may be varied from about 0.02 to about 0.04 percent by weight of the ferrite-forming solids in the slurry. Generally from about 2.0 to 6.0 percent by weight, typically 4.0 percent by weight, of the organic binder is present in the slurry, based on the total weight of the slurry. Although considerable latitude exists in regard to the ferrite-forming particle sizes employed for the slurry, particles having an average particle size less than about 5 micrometers, preferably from 0.5 to 1 micrometer are preferred to avoid high settling rates in the slurry. The spray dried ferrite-forming beads may be collected in drying chambers of suitable size. Spray dried beads have been collected in a chamber 30 inches in diameter and 5 feet in height, with volumetric air flow of 250 cfm. With a system of this type, a product collection rate of about 30 pounds per hour may be maintained. Both types of dryer systems will produce a spray dried product in the size range for a particular electrostatographic use, for example, on the order of 5 to 500 micrometers. In addition, both co-current and counter-current drying systems yield satisfactory products. The temperature of the drying air may be varied from about 150 to about 200° C. at the inlet and from about 50 to about 100° C. at the outlet with satisfactory results. Atomizing pressures typically range from about 20 to 50 psi.

Any suitable type of furnace may be employed in the firing steps of the process of this invention. Typical furnaces include a static furnace, a rotary kiln, or an agitated bed furnace. The static furnace type will generally provide for long residence times. The rotary kiln type of furnace generally provides uniform product reaction, consistent residence time and high capacity throughput. When employing a rotary kiln furnace, a special media such as a flow promoting ingredient for example, aluminum oxide, zirconium oxide, or other materials may be added in combination with the ferrite-forming precursor beads to minimize or avoid bead-to-bead agglomeration and bead to furnace wall sticking. Preferably, the flow promoting ingredient is approximately the same size as the spray dried beads because bead-to-bead agglomeration and bead to furnace wall sticking is substantially eliminated. Thus, if the spray dried beads are about 100 microns, the flow promoting ingredient should also be about 100 microns. In addition, to further avoid or minimize bead sticking to rotary furnace walls a scraping device may be employed individually or in combination with the flow promoting ingredient. In any event, the firing of the ferrite-forming beads should be under controlled conditions so as to preserve the shape and particulate nature of the beads while providing a uniform furnace residence time to produce maximum bead uniformity and desired properties.

As previously mentioned, firing of the spray-dried green beads is carried out in two steps. The beads are first fired at a temperature ranging from approximately 1000° C. to approximately 1500° C. for a period of time of from approximately 10 to 20 hours and are then subsequently fired for a second time at a temperature ranging from about 800° C. to 1000° C. for a period of time of from approximately 4 to 6 hours.

Any suitable size of furnace may be employed in the firing steps of the process described herein to form the ferrite carrier particles of the invention. Static furnaces are preferred because they generally provide a consistent residence time, uniformity of product reaction, and high capacity throughput.

The magnetic ferrite carrier particles of the invention typically exhibit a coercivity ranging from approximately 100 Oersteds to 300 Oersteds when magnetically saturated and an induced magnetic moment of at least 60 EMU/g of carrier in an applied magnetic field of 1000 Oersteds. More typically, the ferrite carrier particles of the invention have an induced magnetic moment of about 60 to 70 EMU/g of carrier in an applied magnetic field of 1000 Oersteds. In contrast to the aforedescribed hard magnetic ferrite materials of the prior art which require a coercivity of at least 300 Oersteds when magnetically saturated in order to provide high development speeds, the W-type single-phase hexagonal crystalline carrier materials of the present invention only require a coercivity of approximately 100 to 300 Oersteds when magnetically saturated to provide the same high development speeds. Moreover, unlike the aforementioned hard magnetic ferrite carrier materials used in the past, the charged carrier particles of the present invention do not produce decreased image densities at such high development speeds when used in developer compositions comprising the charge carrier particles of the present invention and oppositely charged toner particles to develop electrostatographic charge patterns. This is due to the ability of the individual carrier particles of the present invention to form magnetic carrier chains projecting outward from the surface of the outer sleeve or shell of the rotating-core magnetic applicator of lengths greater than the magnetic carrier chains formed by the carrier particles of the prior art so that a greater amount of carrier surface area is available for triboelectrically charging an amount of toner particles sufficient enough and at a high enough charging level to completely develop the electrostatic charge pattern at such high development speeds.

The coercivity of a magnetic material refers to the minimum external magnetic force necessary to reduce the induced magnetic moment from the remanence value to 0 while it is held stationary in the external field and after the material has been magnetically saturated, i.e., the material has been permanently magnetized. A variety of apparatus and methods for the measurement of the coercivity of the present carrier particles can be employed, such as a Princeton Applied Research Model 155 Vibrating Sample Magnometer, available from Princeton Applied Research Company, Princeton, N.J. The powder is mixed with a nonmagnetic polymer powder (90% magnetic powder: 10% polymer by weight). The mixture is placed in a capillary tube, heated above the melting point of the polymer, and then allowed to cool to room temperature. The filled capillary tube is then placed in the sample holder of the magnometer and a magnetic hysteresis loop of external field (in Oersteds) versus induced magnetism (in EMU/g) is plotted. During this measurement, the sample is exposed to external fields of 0 to 10000 Oersteds.

The induced magnetic moment of the carrier particles of this invention in a 1000 Oersteds applied magnetic field is dependent primarily on the composition and concentration of the magnetic material in the particle. The carrier particles of the present invention should exhibit an induced magnetic moment of at least about 60 EMU/g, based on the weight of the carrier, when in an applied magnetic field of 1000 Oersteds, and preferably from about 60 to about 70 EMU/g.

Although uncoated ferrite carrier particles can be used in the developer compositions described herein, it is often desirable to resin-coat the particles with a polymer, as is well known in the art, to better enable the carrier particles to triboelectrically charge the toner particles. When a resin-coated carrier is used, the toner particles acquire an optimally high, net electrical charge because of the frictional contact of the toner particles and the resin coating. The high net charge reduces the amount of toner lost from the developer mix as it is agitated in the magnetic brush apparatus.

The resin in which the carrier particles are coated can be any of a large class of thermoplastic polymeric resins. Especially desirable are fluorocarbon polymers such as poly(vinylidene fluoride) and poly(vinylidene fluoride-co-tetra-fluoroethylene). Also useful are the copolymers of vinylidene chloride with acrylic monomers which are disclosed in U.S. Pat. No. 3,795,617. Other examples include cellulose esters such as cellulose acetate and cellulose acetate butyrate, polyesters such as poly(ethylene terephthalate) and poly(1,4-butanediol terephthalate), polyamides such as nylon and polycarbonates, polyacrylates and polymethacrylates. Still other examples include the thermosetting resins and light-hardening resins described in U.S. Pat. No. 3,632,512; the alkali-soluble carboxylated polymers of U.S. Pat. No. Re. 27,912 (Reissue of U.S. Pat. No. 3,547,822); and the ionic copolymers of U.S. Pat. Nos. 3,795,618 and 3,898,170.

The ferrite carrier particles used in two-component developers normally are larger in size than the toner particles. They have, for example, an average diameter from 5 to 500 micrometers, preferably from 5 to 100 micrometers and most preferably, 5 to 60 micrometers.

In coating the ferrite carrier particles with resin, the carrier particles are mixed with finely-divided powdered resin. The particle size of the powdered resin can vary considerably but should be smaller than the particle size of the carrier particles. The resin particles can range in average diameter from 0.01 to 50 micrometers although a particle size from 0.05 to 10 micrometers is preferred.

The amount of resin powder relative to the amount of carrier particles can vary over a considerable range, but preferably, is from 0.05 to 5 weight percent. By using such a small amount of resin, it is possible to form a discontinuous resin coating or a very thin resin coating on the ferrite particles and retain good conductivity in accordance with the invention.

To dry-mix the carrier particles and resin particles, they preferably are tumbled together in a rotating vessel. This dry mixing should continue preferably for several minutes, e.g., for 5 to 30 minutes. Other methods of agitation of the particles are also suitable, e.g., mixing in a fluidized bed with an inert gas stream, or mixing by a mechanical stirrer.

After dry mixing the carrier particles and resin powder as described, the resin is bonded to the carrier particles, for example, by heating the mixture in an oven at a temperature and for a time sufficient to achieve bonding.

As discussed previously, the carrier particles of the invention are employed in combination with toner particles to form a dry, two-component developer composition. In use, the toner particles are electrostatically attracted to the electrostatic charge pattern on an element while the carrier particles remain on the applicator shell. This is accomplished in part by intermixing the carrier and toner particles so that the carrier particles acquire a charge of one polarity and the toner particles acquire a charge of the opposite polarity. The charge polarity on the carrier is such that it will not be electrically attracted to the electrostatic charge pattern. The carrier particles also are prevented from depositing on the electrostatic charge pattern because the magnetic attraction exerted between the rotating core and the carrier particles exceeds the electrostatic attraction which may arise between the carrier particles and the charge image.

Tribocharging of toner and hard magnetic carrier is achieved by selecting materials that are so positioned in the triboelectric series to give the desired polarity and magnitude of charge when the toner and carrier particles intermix. If the carrier particles do not charge as desired with the toner employed, the carrier can be coated with a material which does. Such coating materials and methods have been previously described herein. The charging level in the toner is at least 5 microcoulombs per gram of toner weight. Charging levels from about 10 to 30 microcoulombs per gram of toner are preferred, while charging levels up to about 150 microcoulombs per gram of toner are also useful. At such charging levels, the electrostatic force of attraction between toner particles and carrier particles is sufficient to disrupt the magnetic attractive forces between carrier particles, thus facilitating replenishment of the developer with fresh toner. How these charging levels are measured is described immediately below. The polarity of the toner charge can be either positive or negative.

The charging level or charge-to-mass ratio on the toner, $Q/M$, in microcoulombs/gram, is measured using a standard procedure in which the toner and carrier are placed on a horizontal electrode beneath a second horizontal electrode and are subjected to both an AC magnetic field and a DC electric field. When the toner jumps to the other electrode change in the electric charge is measured and is divided by the weight of toner that jumped. It will be appreciated, in this regard, that the carrier will bear about the same charge as, but opposite in polarity to, that of the toner.

The developer is formed by mixing the particles with toner particles in a suitable concentration. Within developers of the invention, high concentrations of toner can be employed. Accordingly, the present developer preferably contains from about 70 to 99 weight percent carrier and about 30 to 1 weight percent toner based on the total weight of the developer; most preferably, such concentration is from about 75 to 99 percent carrier and from about 25 to 1 weight percent toner.

The toner component of the invention can be a powdered resin which is optionally colored. It normally is prepared by compounding a resin with a colorant, i.e., a dye or pigment, and any other desired addenda. If a developed image of low opacity is desired, no colorant need be added. Normally, however, a colorant is included and it can, in principle, be any of the materials mentioned in Colour Index, Vols. I and II, 2Nd Edition. Carbon black is especially useful. The amount of colorant can vary over a wide range, e.g., from 3 to 20 weight percent of the polymer. Combinations of colorants may be used.

The mixture is heated and milled to disperse the colorant and other addenda in the resin. The mass is cooled, crushed into lumps and finely ground. The resulting toner particles range in diameter from 0.5 to 25 micrometers with an average size of 1 to 16 micrometers. Preferably, the average particle size ratio of carrier to toner lie within the range from about 15:1 to about 1:1. However, carrier-to-toner average particle size ratios of as high as 50:1 are also useful.

The toner resin can be selected from a wide variety of materials, including both natural and synthetic resins and modified natural resins, as disclosed, for example, in the patent to Kasper et al, U.S. Pat. No. 4,076,857 issued Feb. 28, 1978. Especially useful are the crosslinked polymers disclosed in the patent to Jadwin et al, U.S. Pat. No. 3,938,992 issued Feb. 17, 1976, and the patent to Sadamatsu et al, U.S. Pat. No. 3,941,898 issued Mar. 2, 1976. The crosslinked or noncrosslinked copolymers of styrene or lower alkyl styrenes with acrylic monomers such as alkyl acrylates or methacrylates are particularly useful. Also useful are condensation polymers such as polyesters.

The shape of the toner can be irregular, as in the case of ground toners, or spherical. Spherical particles are obtained by spray drying a solution of the toner resin in a solvent. Alternatively, spherical particles can be prepared by the polymer bead swelling technique disclosed in European Pat. No. 3905 published Sep. 5, 1979, to J. Ugelstad.

The toner can also contain minor components such as charge control agents and antiblocking agents. Especially useful charge control agents are disclosed in U.S. Pat. No. 3,893,935 and British Pat. No. 1,501,065. Quaternary ammonium salt charge agents are disclosed in Research Disclosure, No. 21030, Volume 210, October, 1981 (published by Industrial Opportunities Ltd., Homewell, Havant, Hampshire, P09 1EF, United Kingdom), are also useful.

Developers including the ferrite carrier particles of this invention when employed in an apparatus such as that described in U.S. Pat. No. 4,473,029, exhibit a dramatic increase in copy image density when compared to a hard ferrite material of the prior art while providing the same high development speeds or efficiencies as that provided by the hard ferrite material of the prior art when operated at the same voltage differential of the magnetic brush and photoconductive film.

In the method of the present invention, an electrostatic image is brought into contact with a magnetic brush comprising a rotating-magnetic core, an outer non-magnetic shell and a two-component, dry developer described above. The electrostatic image so developed can be formed by a number of methods such as by image-wise photodecay of a photoreceptor, or image-wise application of a charge pattern on the surface of a dielectric recording element. When photoreceptors are employed, such as in high-speed electrophotographic copy devices, the use of half tone screening to modify an electrostatic image can be employed, a combination of screening with development producing high-quality images exhibiting high $D_{max}$ and excellent tonal range. Representative screening methods including those employing photoreceptors with integral half-tone screens are disclosed in U.S. Pat. No. 4,385,823.

The following non-limiting examples further illustrate the invention.

EXAMPLE 1

A carrier composition of the invention was prepared as follows.

Powders of iron oxide (255.51 grams), barium carbonate (39.47 grams) and zinc oxide (32.55 grams) were mixed thoroughly. In a separate container, a stock solution was prepared by dissolving 4 weight percent (based on the weight of the solution) of a binder resin, i.e., gum arabic and 0.03 weight percent ammonium polymethacrylate surfactant (sold by W. R. Grace and Company as "Daxad-32") in distilled water. The powders were mixed with a stock solution and a 50:50 weight ratio and the mixture was ball milled for about 24 hours then spray dried in a Niro spray dryer. The green bead particles thus formed were classified to obtain a suitable particle size distribution of 5 to 45 micrometers. The green bead particles were then fired at 1,200° C. for 10 hours and then at a 1,000° C. for 4 hours. The fired cake thus obtained was a single-phase, W-type hexaferrite powder which was deagglomerated and sieved to be used as a carrier. The saturation magnetism or induced magnetic moment of the carrier particle was approximately 59.8 EMU/g in an applied field of 1000 Oersteds as measured herein and a coercivity of the carrier particles was 302 Oersteds when magnetically saturated as measured herein.

EXAMPLE 2

A carrier composition of the invention was prepared as follows.

Powders of iron oxide (255.51 grams), barium carbonate (39.47 grams) and cobalt carbonate (47.58 grams) were mixed thoroughly. In a separate container, a stock solution was prepared by dissolving 4 weight percent (based on the weight of the solution) of a binder resin, i.e., gum arabic and 0.03 weight percent ammonium polymethacrylate surfactant (sold by W. R. Grace and Company as "Daxad-32") in distilled water. The powders were mixed with the stock solution in a 50:50 weight ratio and the mixture was ball milled for about 24 hours and spray dried in a Niro spray dryer. The green bead particles thus formed were classified to obtain a suitable particle size distribution. The green bead particles were then fired at 1,200° C. for 10 hours and then at 1,000° C. for 4 hours. The fired cake thus obtained was a single-phase, W-type hexaferrite powder which was deagglomerated and then sieved to be used as a carrier. The saturation magnetism or induced magnetic moment of the carrier particle was approximately 65.6 EMU/g when in an applied field of 1000 Oersteds as measured herein and the coercivity of the carrier particles was 197 Oersteds when magnetically saturated as measured herein.

EXAMPLE 3

A carrier composition of the invention was prepared as follows.

Powders of iron oxide (223.57 grams), barium carbonate (39.47 grams) and cobalt carbonate (47.58 grams) were mixed thoroughly. In a separate container, a stock solution was prepared by dissolving 4 weight percent (based on the weight of the solution) of a binder resin, i.e., gum arabic and 0.03 weight percent ammonium polymethacrylate surfactant (sold by W. R. Grace and Company as "Daxad-32") in distilled water. The powders were mixed with the stock solution in a 50:50 weight ratio and the mixture was ball milled for about 24 hours then spray dried in a Niro spray dryer. The green bead particles thus formed were classified to obtain a suitable particle size distribution. The green bead particles were then fired at 1,200° C. for 10 hours and then at 1,000° C. for 4 hours. The fired cake thus obtained was a single-phase, W-type hexaferrite powder which was deagglomerated and then sieved to be used as a carrier. The saturation magnetism or induced magnetic moment of the carrier particle was approximately 62.0 EMU/g when in an applied field of 1000 Oersteds as measured herein and the coercivity of the carrier particles was 156 Oersteds when magnetically saturated as measured herein.

EXAMPLE 4

A control carrier composition comprising strontium ferrite having the structure $SrFe_{120}O_{19}$ was prepared as follows.

Powders of iron oxide (215.05 grams) and strontium carbonate (34.95 grams) were mixed thoroughly. In a separate container, a stock solution was prepared by dissolving 4 weight percent (based on the weight of the solution) of a binder resin, i.e., gum arabic and 0.03 weight percent ammonium polymethacrylate surfactant (sold by W. R. Grace and Company as "Daxad-32") in distilled water. The powders were mixed with the stock solution in a 50:50 weight ratio and the mixture was ball milled for about 24 hours and spray dried in a Niro spray dryer. The green bead particles thus formed were classified to obtain a suitable particle size distribution. The green bead particles were then fired at 1,200° C. for 10 hours and then at 1,000° C. for 4 hours. The fired cake thus obtained was a single-phase, "M" hexagonal ferrite powder having a particle size distribution of 5 to 45 micrometers which was deagglomerated and then sieved to be used as a carrier. The saturation magnetism or induced magnetic moment of the carrier particle was approximately 55.3 EMU/g when in an applied field of 1000 Oersteds as measured herein and the coercivity of the carrier particles was 1980 Oersteds when magnetically saturated as measured herein.

EXAMPLE 5

Carrier particles prepared as described in Example 2 were tested for development efficiency and copy image density by forming a two-component developer composition comprising a cyan pigmented polyester toner having a mean volume average diameter of 3.8 micrometers and a toner charge of 135 microcoulombs per gram of toner and the carrier particles prepared as described in Example 2 dry coated (230° C.; 4 hours) with 1pph Kynar 301F fluorocarbon polymer obtained from the Pennwalt Chemical Company, King of Prussia, Pa., which enabled the carrier to charge the toner positively.

The developer was formulated by mixing the carrier and the toner. The concentration of the toner was 8 percent by weight of the total developer composition. The carrier particles had a mean volume average diameter of 35 micrometers.

The charge on the toner in microcoulombs/g, Q/M, was measured using a procedure in which the toner and carrier were placed on a horizontal electrode and subjected to both an AC magnetic field and a DC electric field. When the toner jumped to the other electrode, the change in the electrical charge was measured and was divided by the weight of the toner that jumped.

A control developer also was prepared for comparison consisting of carrier particles comprising the single-phase hexagonal "M"-type strontium ferrite material prepared as described in Example 4 and the same cyan pigmented polyester toner having a volume average diameter of 3.8 micrometers and a toner charge of 135 microcoulombs per gram of toner described above. The concentration of the toner particles in the developer composition also was 8 percent by weight of the total developer composition. These carrier particles also were dry coated (230° C.; 4 hours) with 1 pph Kynar 301F fluorocarbon polymer described above.

After shaking in separate glass vials for two minutes, the developer compositions prepared as described above were applied to an electrostatic image-containing multi-active organic photoconductive element using a rotating-core magnetic applicator housed on a linear breadboard device having two electrostatic probes, one before the magnetic brush development station and one after the magnetic brush development station to measure the voltage on the photoconductive film or element before and after development. The magnetic applicator included a 5.08 cm outside diameter, non-magnetic stainless steel shell 15.24 cm in axial length. A core containing ten alternating pole magnets was enclosed in the shell which produced a magnetic field of 900-1000 Oersteds on the shell surface. The tests were made while rotating the core of magnets at 1200 revolutions per minute in a direction counter to the direction in which the photoconductive element moved. The shell of the applicator was rotated at 5 to 50 revolutions per minute. Developer was distributed on the shell from a feed hopper and traveled clockwise around the shell. A trim skive was set to provide a nap thickness of 5-40 mils.

The photoconductive element employed comprised an organic multi-active photoconductive film as previously mentioned. The film was a negatively charged reusable film. Electrostatic images were formed thereon by uniformly charging the element to approximately −500 volts and exposing the charged element to an original document. The magnetic brush was maintained at approximately −25 volts. The resulting charge images were developed by passing the element over the magnetic brush at speeds of 2.54 cm/sec, 5.04 cm/sec, 7.62 cm/sec and 10.16 cm/sec in the direction of developer flow.

After development, the charge on the photoconductive film in developed areas was measured and the development efficiencies of the respective developer compositions at the respective development speeds of 2.54 cm/sec, 5.04 cm/sec, 7.62 cm/sec and 10.16 cm/sec were determined by dividing the potential difference between the photoconductive film in the developed image areas before and after development by the potential difference between the photoreceptor and the brush prior to development and multiplying by 100. Thereafter, the developed toner image was electrostatically transferred to a paper receiver of photographic reflection paper stock and thereon fixed by roller fusion at a temperature of approximately 106° C. $D_{max}$ measurements using an X-Rite Model 310 Densitometer manufactured by X-Rite of Grandsville, Mich. equipped with a Class A-filter were taken of a small area (25 mm×7.0 mm) of the developed and fixed images. The background density of the receiver paper was zeroed prior to recording the density of the transferred images.

The development efficiencies of each of the developer compositions at the four different development velocities are shown in the table below as well as the $D_{max}$ values of each.

TABLE

| Developer Velocity | % Development Efficiency | | Image Quality ($D_{max}$) | |
|---|---|---|---|---|
| | Control Carrier | Ba—Co Ferrite Carrier of Example 2 | Control Carrier | Ba—Co Ferrite Carrier of Example 2 |
| 2.54 cm/sec | 62 | 82 | 2.36 | 2.45 |
| 5.04 cm/sec | 40 | 70 | 1.73 | 2.45 |
| 7.62 cm/sec | 20 | 58 | 0.95 | 2.38 |
| 10.16 cm/sec | 18 | 50 | 0.75 | 2.23 |

The above table shows that the efficiency of development was improved from 62% to 82% at a developer velocity of 2.54 cm/sec, from 40% to 70% at a developer velocity of 5.04 cm/sec, from 20% to 58% at a developer velocity of 7.62 cm/sec and from 18% to 50% at a developer velocity of 10.16 cm/sec using the carrier particles of the present invention, all other conditions of development remaining the same. The table also show that a higher $D_{max}$ was obtained using the carrier particles of the present invention as compared to the control carrier composed of the conventional "M"-type strontium ferrite material.

The invention has been described in detail with particular reference to preferred embodiments thereof, but it will be understood that variations and modifications can be effected within the spirit and scope of the invention.

We claim:

1. Carrier particles suitable for magnetic brush development of electrostatic charge patterns comprising hard magnetic ferrite material having a single-phase, W-type hexagonal crystalline structure represented by the general formula $MFe_{16}Me_2O_{27}$ wherein M is strontium or barium and Me is a divalent transition metal selected from the group consisting of nickel, cobalt, copper, zinc, manganese, magnesium, iron and mixtures thereof, exhibiting a coercivity of from approximately 100 to 300 Oersteds when magnetically saturated and an induced magnetic moment of at least 60 EMU/g when in an applied magnetic field of 1000 Oersteds.

2. Carrier particles of claim 1, wherein M is barium.
3. Carrier particles of claim 1, wherein M is strontium.
4. Carrier particles of claim 2, wherein Me is cobalt.
5. Carrier particles of claim 2, wherein Me is zinc.
6. Carrier particles of claim 3, wherein Me is cobalt.
7. Carrier particles of claim 3, wherein Me is zinc.
8. Carrier particles of claim 1, wherein the particles are coated with a discontinuous tribocharging resin layer.
9. Carrier particles of claim 1, wherein said particles have a size of about 5 to about 16 micrometers in diameter.
10. An electrostatographic two-component dry developer composition suitable for magnetic brush development of electrostatic charge patterns which comprises a mixture of charged toner particles and oppositely charged carrier particles comprising hard magnetic ferrite material having a single-phase, W-type hexagonal crystalline structure represented by the general formula $MFe_{16}Me_2O_{27}$ where M is strontium or barium and Me is a divalent transition metal selected from the group consisting of nickel, cobalt, copper, zinc, manganese, magnesium, iron and mixtures thereof, exhibiting a coercivity of from approximately 100 to 300 Oersteds when magnetically saturated and an induced magnetic moment of at least 60 EMU/g when in an applied magnetic field of 1000 Oersteds.
11. A composition of claim 10, wherein M is strontium.
12. A composition of claim 10, wherein M is barium.
13. A composition of claim 11, wherein Me is cobalt.
14. A composition of claim 11, wherein Me is zinc.
15. A composition of claim 12, wherein Me is cobalt.
16. A composition of claim 12, wherein Me is zinc.
17. A method of developing an electrostatic charge pattern comprising contacting the charge pattern with a two-component dry developer composition of claim 10.

* * * * *